(12) United States Patent
Walker

(10) Patent No.: US 7,997,503 B2
(45) Date of Patent: Aug. 16, 2011

(54) VISUAL CODE TRANSACTION VERIFICATION

(76) Inventor: Matthew Walker, Brisbane (AU)

( * ) Notice: Subject to any disclaimer, the term of this patent is extended or adjusted under 35 U.S.C. 154(b) by 329 days.

(21) Appl. No.: 12/440,500

(22) PCT Filed: Dec. 31, 2006

(86) PCT No.: PCT/AU2006/002013
§ 371 (c)(1), (2), (4) Date: Mar. 9, 2009

(87) PCT Pub. No.: WO2008/028215
PCT Pub. Date: Mar. 13, 2008

(65) Prior Publication Data
US 2009/0277968 A1 Nov. 12, 2009

(30) Foreign Application Priority Data
Sep. 7, 2006 (AU) ................................ 2006904878

(51) Int. Cl.
*G06K 19/06* (2006.01)
(52) U.S. Cl. ......... 235/494; 235/487; 235/435; 235/457
(58) Field of Classification Search .................. 235/487, 235/435, 457, 494
See application file for complete search history.

(56) References Cited

U.S. PATENT DOCUMENTS

| 4,921,278 | A  | * | 5/1990 | Shiang et al. ................... 283/87 |
| 4,991,205 | A  |   | 2/1991 | Lemelson |
| 6,249,588 | B1 | * | 6/2001 | Amidror et al. ............. 382/100 |
| 7,181,433 | B2 |   | 2/2007 | Yousofi |
| 2005/0117748 | A1 | * | 6/2005 | Schrijen et al. ............... 380/200 |
| 2006/0018467 | A1 |   | 1/2006 | Steinmetz |
| 2006/0020559 | A1 |   | 1/2006 | Steinmetz |
| 2006/0031174 | A1 |   | 2/2006 | Steinmetz |

FOREIGN PATENT DOCUMENTS

| AU | 746473 B2 | 5/2002 |
| DE | 10260124 A1 | 7/2004 |
| GB | 1434907 A | 5/1976 |
| WO | 99/26793 A1 | 6/1999 |
| WO | 01/11591 A1 | 2/2001 |
| WO | 03/060674 A1 | 7/2003 |
| WO | 03/067797 A1 | 8/2003 |

OTHER PUBLICATIONS

International Search Report for PCT/AU2006/002013.

* cited by examiner

*Primary Examiner* — Michael G Lee
*Assistant Examiner* — Kristy A Haupt
(74) *Attorney, Agent, or Firm* — Brooks Kushman P.C.

(57) ABSTRACT

The invention is an improved transaction verification method comprising a document, card or electronic apparatus with a transparent optical pattern visible to the user on a transparent window display. The verification process is performed by a user aligning the transparent pattern over a synchronized pattern image. The optical combination of these patterns induces a visual code, to be apparent to the user, which is then manually entered into a remote terminal or directly to the electronic apparatus to verify the transaction.

5 Claims, 8 Drawing Sheets

FIG.1
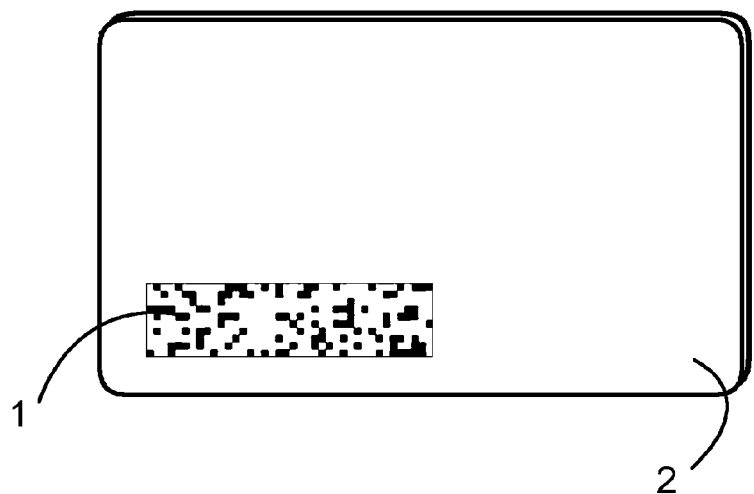
[Fig. 2]
FIG.2
FIG.2A
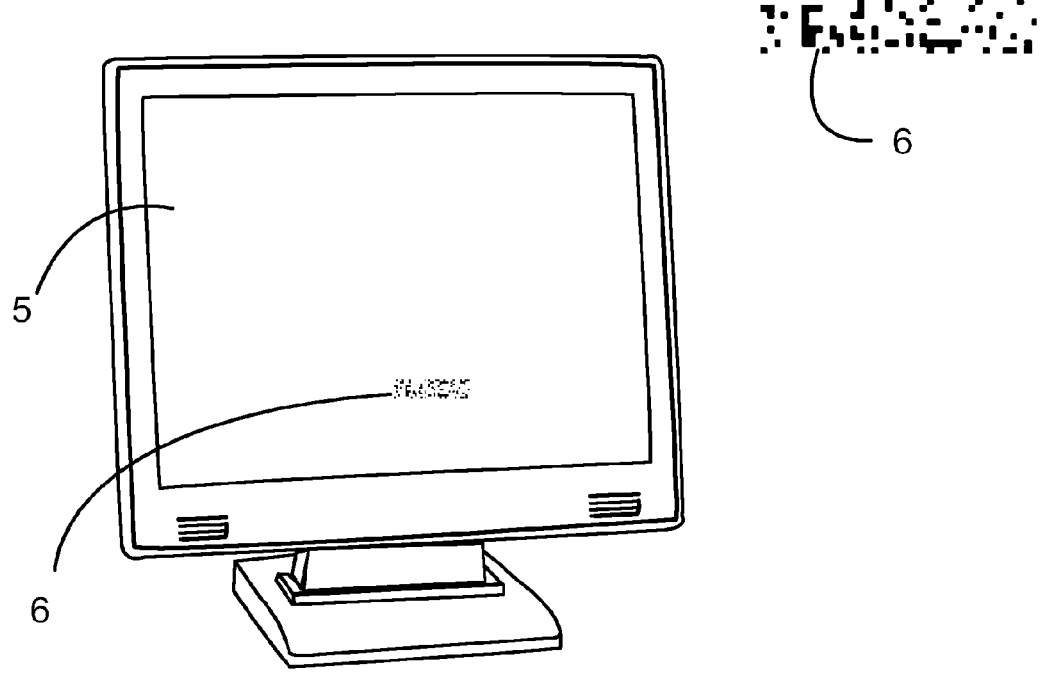

[Fig. 4]

VISUAL CODE TRANSACTION VERIFICATION

DETAILED DESCRIPTION

The present invention relates to a visual code transaction verification method. The method is enabled through a variety of different embodiments. One such embodiment being a standard plastic identification card or document with a recorded static optical pattern printed on a transparent section. Another potential embodiment is a version consisting of an electronic apparatus which consists of a digital transparent display connected to a processor which generates dynamic optical patterns using a cryptographic algorithm, synchronized with either a screen generated pattern image or another similar electronic apparatus, complete with its own electronic transparent display. This electronic apparatus would preferably take the form of a conventional membership card with added electronic functionality.

The user aligns the transparent pattern across a digital screen such as an internet connected computer screen or another electronic apparatus which displays a specific generated pattern image synchronized to correspond to the user's recorded static card pattern or a cryptographic algorithm.

When the transparent optical pattern section displayed on the user's card is aligned correctly, in synchronization with the corresponding generated optical pattern, the overlaid patterns of both layers optically combined will present the card holder with an identifiable series of characters, numbers, shapes or symbols. This unique visual code, which is only decipherable by matching the correctly generated optical patterns, is then manually entered into either the online website form or electronic apparatus to verify the validity of the identification request or transaction.

The optical patterns used in this invention are rendered in a wide variety of possible optical embodiments. These can include anything from the small square patterns depicted in FIGS. 1, 2, 2A, 3, 3A, 4, 5, 5A, 5B, 8, 9 and 10, to any number of other possible shapes which can be manipulated and combined to form a readable pattern. A pattern variation which uses segment display shapes commonly used in digital watches and pocket calculators is depicted in FIGS. 6, 6A and 6B.

Further optical obfuscation security is generated by warping characters or symbols, obfuscation of any straight lines or solid patterns with shades or transparent spotting, using lighter semi-transparent shades overlaid or color mixing effects to create darker or lighter shades and seeding the generated image pattern with false patterns designed to confuse optical analysis when either the transparent pattern or screen generated pattern is displayed independently.

The invention is functional in both an electronic and non electronic method. The non electronic method can be as simple as printing a static pattern on a transparent window and recording said pattern on a secure centralized database for use in remotely generating a screen image synchronized to the user's static pattern over an internet connection. The electronic version provides for an apparatus with built in dynamic transparent digital display, modified by an internal processor configured with a cryptographic algorithm, which provides a higher level of security for both online verification and electronic apparatus to electronic apparatus transaction verification. The visual code verification invention provides a method for changing the user's remote verification code by adjusting the generated image at the time of transaction verification request. At the same time, neither separate optical pattern individually exposes enough of the visually identifiable code without the presence of the corresponding pattern aligned correctly. This visual code method creates a manipulatable one time password which is very difficult to decipher without the presence of the user's corresponding transparent pattern.

The non electronic embodiment's transparent optical pattern is electronically recorded on a central secure internet connected server so that modification calculations can be made to the screen generated image to induce the readable optical code effect when the user's transparent pattern is correctly placed over the screen generated image. The method is employable for any transaction verification purpose including online card payment transactions and indeed any situation where transaction verification is required. Membership cards or other non electronic embodiments with transparent sections can be produced using cheap existing technology with no specialized electronic identification verification apparatus needed at the user's end or server side. Apparatus with electronic transparent displays and internal processors, whilst more expensive than the non electronic version, enable higher security than traditional hardware tokens as well as improved inter-apparatus transaction possibilities, without expensive communication infrastructure.

A further method of providing a transparent optical pattern utilizes any of the following optical properties to generate the desired optical code effect.

transparent colored overlays
transparent holographic material
transparent prism layers
transparent polarizing material
transparent dichroic material
transparent photochromatic layers The properties of any of these materials may be used on the transparent window or screen to produce different optical effects which will reveal the visual optical code and therefore enable a greater degree of both cryptographic and optical security.

A second embodiment of the non electronic version involves changing the shape or location of the transparent section and printed code pattern on the document or card as shown in FIG. 4 as well as changing the appearance or size of the screen generated image. For added cryptographic security a synchronized image marker can be printed on the document or card as shown in FIG. 5. When this synchronized image marker is aligned with a similar marker on or near the generated image it enables the image to have variable sizes and shapes and therefore increases the cryptographic security by obfuscating the relevant card printed pattern image size and overlay location on the generated image.

A further variation on the transaction verification method is shown in FIG. 8: A static pattern is printed onto the transparent section of the document or card which is then placed over an animated screen generated pattern which the user stops at the point where the two patterns match. This method makes the visual code easier to see and understand on a variety of screens and other optical situations. Unfavorably, the position and shape of the pattern are static and so the same pattern match views are used each time. This degrades the security of the system if the process is intercepted with a screen and/or key logging program which might be surreptitiously installed on the computer generating the image and receiving the users manual response. The code is thereafter decipherable as a result of the third party's knowledge of the proportional positions and subsequent screen generated pattern image.

A further variation on the transaction verification method is shown in FIG. 7: A few small, randomly placed, transparent shapes are left visible on a printed opaque section of the card.

This section is then placed over the screen generated image, which is a grid of characters, and the user types in the specific characters which can be viewed through the transparent shapes. This method makes the visual code easier to see and understand on a variety of screens and other optical situations. Unfavorably, the position of transparent shapes is static and so the same proportional views are used each time. This degrades the security of the system if the process is intercepted with a screen and/or key logging program which might be surreptitiously installed on the computer generating the image and receiving the users manual response. The code is thereafter decipherable as a result of the third party's knowledge of the proportional positions and subsequent screen generated images.

The computerized transaction verification method of the non electronic embodiment comprises a secure database of transparent pattern records and a program capable of using these records to generate synchronized screen image patterns for a transaction verification request made from a remote internet connected computer terminal. The user will then correctly align said non electronic embodiment's transparent optical pattern over said screen image pattern, the combination of which will generate a visual code effect for the user. This unique confirmation code will be manually entered into said remote computer terminal. This method is well adapted to being run over an internet system at such times as identification or transaction verification is required.

A variation of the transaction verification method could include the use of a printed version of the generated image pattern, on a regular piece of paper, which is then used in place of the digital screen and in conjunction with the transparent optical pattern to display the verification code. This variation, while not as flexible as others, provides an extremely cheap method for use in counterfeit packaging verification or situations where electronics are not suitable.

Another embodiment of the invention is a transaction verification apparatus as shown in FIG. 10 preferably taking the form of an electronic smart card with a built in transparent digital display, battery, memory, processor and flat keypad. The processor is configured to generate a dynamic optical pattern using a cryptographic algorithm which will then be displayed on the transparent digital display. This dynamic optical pattern, in correct alignment with either a computer screen generated pattern image or another similar electronic apparatus, is configured to reveal a unique visual code to the user which is then directly entered into the flat keypad of the apparatus for transaction verification.

The computerized transaction verification method of the electronic apparatus embodiment comprises a program capable of generating a synchronized screen image pattern for a transaction verification request made from a remote internet connected computer terminal. The user will then correctly align said apparatus transparent optical pattern over said screen image pattern the combination of which will generate a visual code effect for the user. This unique confirmation code will be manually entered into either said remote computer terminal or electronic apparatus for transaction confirmation. The synchronized screen image pattern will be generated based on a secure cryptographic algorithm.

A further variation of the invention includes a sliding protective panel which covers the transparent optical pattern of the card or apparatus when it is not in use.

These and other advantages of the present invention will become apparent to those skilled in the art upon reading and understanding the following detailed description with reference to the accompanying figures.

BACKGROUND ART

The increasing use of transaction verification throughout the world is most visibly exhibited in the credit card or other card payment systems being used commonly in grocery stores, universities and more increasingly, internet websites. The prevalent problem with remote payment card systems has been remote transaction verification. The primary method of transaction verification security uses the user's signature which is often signed onto the sales receipt. Apart from being relatively easy to forge, the signature system does not adapt itself to modern remote electronic medium, such as the internet. An early verification method involved a basic Luhn algorithm to generate each unique card number in a non sequential manner which is then verified by testing against the algorithm. It is not intended to be cryptographically secure; it protects against accidental error, not malicious attack. This basic method of verification became increasingly invalid with the advent of the internet, as fraud increased and details of the algorithm became widespread. Today, half of all credit card fraud is conducted online. In response to this widespread fraud, credit card companies have implemented a static CVV (Card Verification Value) number printed on the back or front of cards at time of issue. The CVV, usually a 3 or 4 digit number, is required to be entered at the time of transaction, particularly with online payment. The disadvantage of the CVV number system is that many modern credit card fraud systems use card details including static CVV numbers gained from hacking online shopping payment databases, phishing techniques or screen and keylogging programs installed on the victim's computer system. Obviously, the major drawback to the CVV number system is the static nature of the printed numbers which mean once the card details are compromised the victim can easily be defrauded repeatedly. Furthermore, the simple static nature of the CVV number system method offers little proof that the remote user actually has the physical card in their possession as this simple 3 or 4 digit number can easily be shared alongside other card details. In response to this weak security method some banks have begun issuing members with a one-time password generating electronic device or hardware token. These devices have a small screen and button which, when pressed, generates a one time dynamically changing password using encrypted secret key programming, changing the password code every minute or so. The disadvantages of this system are the enormous expense of buying and issuing these electronic devices, battery maintenance, electronic fragility, inability to carry inside conventional wallets, separation from required membership card, and internal clock synchronization necessary with remote server. Smart Card technology has also been proposed as a secure method. This method has not become widely used, however, due to the issues of remote infrastructure cost and availability, electronic cloning, cost of cards with integrated circuits and fragility of those circuits when in day to day use. Proximity cards used as a payment system in some transportation services have also been proposed. Apart from suffering from the same problems as smart card systems they also have the added security issue of a potential unauthorized third party cloning or charging the card at a distance. The essence of the current problem is the need for a secure one time dynamically manipulatable password transaction verification system without the associated remote infrastructure costs and electronic security vulnerabilities.

DISCLOSURE OF INVENTION

Technical Problem

Transaction verification minimizing remote specialized electronic hardware, communication and infrastructure costs. Security against modern electronic phishing, keylogging or electronic eavesdropping techniques.

Technical Solution

By using this invention method, transaction verification can be performed over either a universal internet connected computer terminal o r directly from another electronic apparatus without using any specialized communication infrastructure. Security is provided by separating the visual optical code into unidentifiable patterns. The dynamic visual code effect is only apparent to the user when physically aligned with its correctly synchronized pattern which defeats most electronic phishing, keylogging or electronic eavesdropping techniques.

Advantageous Effects

The non electronic version benefits from the security of a one time password system combined with the durability associated with not using remote electronics or power source other than a standard internet connected computer terminal, and easily works with cheap existing identification card technology.

The electronic apparatus version, with a transparent digital display, provides extra security with its dynamic transparent display ability as well as internal cryptographic processor which enables a much higher degree of cryptographic strength and apparatus to apparatus transaction verification without needing a direct electronic communication.

Both versions of the invention can easily perform transaction verification operated from a standard secure internet connected database server with little overhead processing needed to authenticate users or verify transactions. The visually obfuscated verification code effect provides excellent security against both on and offline attacks. Easy to use and very adaptable to internet applications the method is able to operate on ubiquitous computer screens available around the world while managed from a secure central server. The minimal use of remote infrastructure, direct electronic communication and dedicated electronic hardware enable extremely cheap setup costs and easy implementation.

The option of no electronic hardware on the non electronic card version improves the durability, security and life of these cards while preventing complex electronic hacking attempts. Unlike Smart Cards and RFID cards, the non electronic cards are not vulnerable to internal damage from the pressure or flexing incurred with normal use, such as inside a wallet or back pocket. The technology is simple and more resistant to in-shop fraud, for example when the card is passed to a waiter for payment at the end of a meal, as the code is more difficult to memorize with visual cues by potential criminals than the three digit CVV number or replication of the users signature. The technology also works easily alongside existing identification and transaction verification security systems i.e. CVV, Smart Card, RFID, magnetic strip.

DESCRIPTION OF DRAWINGS

Although the invention will be described in terms of a specific embodiment as shown in the drawings, it will be readily apparent to those skilled in the art that additional modifications, rearrangements and substitutions can be made without departing from the spirit of the invention. Please note that for the purpose of clear illustration none of the diagram patterns depict semi-transparent shading techniques.

FIG. 1 is a pictorial view of an opaque conventional plastic membership card 2 with a transparent window and an example of a possible static printed pattern 1 thereon.

FIG. 2 is a pictorial view of the synchronized screen generated image pattern 6 as shown on a typical computer screen 5.

FIG. 2A is an enlarged view of the screen generated image pattern 6.

FIG. 5A is a pictorial view illustrating a synchronized screen generated image pattern 29 which is larger proportioned than the user's synchronized transparent card pattern so as to induce a larger amount of obfuscation pattern security into the screen generated pattern. An alignment marker image 30 is generated with the screen generated image pattern to conform with the known proportional relationship between the user's alignment marker 25 and its transparent card pattern 26.

FIG. 5B is a pictorial view demonstrating the correct alignment of the user's alignment marker 25 over the screen generated alignment marker 30 which creates a visibly easy synchronized view of both markers 27. This provides an easy method for the user to align the card over only the relevant portion containing the correctly synchronized pattern to create the password code effect 28 on the screen generated image 29. This allows increased cryptographic complexity to be introduced into the generated image without affecting the intended password code effect 28.

FIG. 6A is a pictorial view illustrating a synchronized screen generated segment display image pattern 34 which is generated to synchronize with the known segment display type pattern 33.

FIG. 6B is a pictorial view demonstrating the correct alignment of the user's transparent segment display pattern 33 over the screen generated segment display image pattern 34. The combination of both patterns reveals to the user the intended password code effect 35.

FIG. 7A is a pictorial view illustrating a screen generated image pattern of characters 40 which correspond to the proportional arrangement of the users known printed card holes. An alignment marker image 41 is also included to align the user's card over only the relevant characters.

FIG. 7B is a pictorial view demonstrating the card user's correct alignment of the card's alignment marker 36 over the screen generated complimentary alignment marker 41 presenting the user with a synchronized view of both markers 38. This provides the correct alignment of the card's 37 transparent holes over the relevant screen generated characters 40 which presents the user with the intended password code effect 39.

MODE FOR INVENTION

Figure 3:
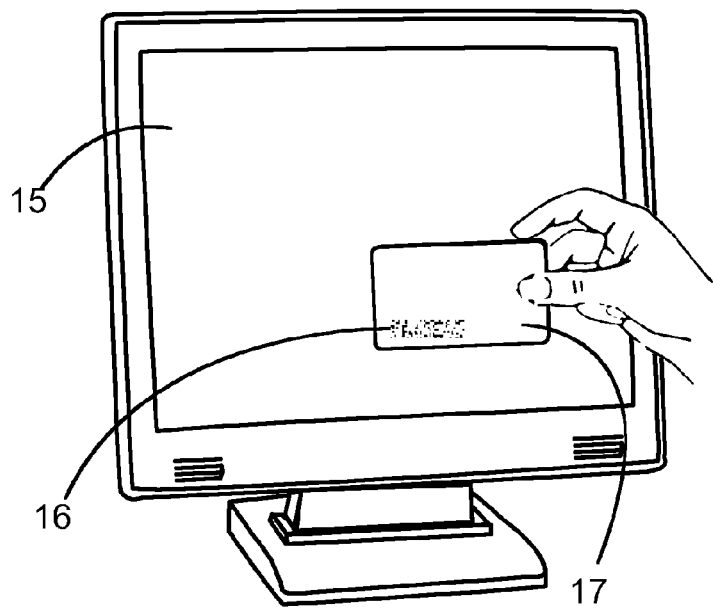
FIG. 3 is a pictorial view illustrating the user's card 17 placed over a standard computer screen 15. The card's transparent pattern 16 is aligned over the screen generated image.
Figure 3A:
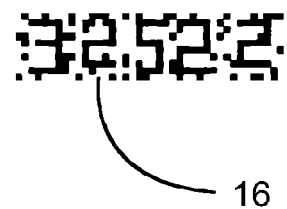
FIG. 3A is an enlarged view of the specific optical code effect 16 apparent to the user when the transparent card pattern is correctly aligned over the screen generated image pattern.
Figure 4:
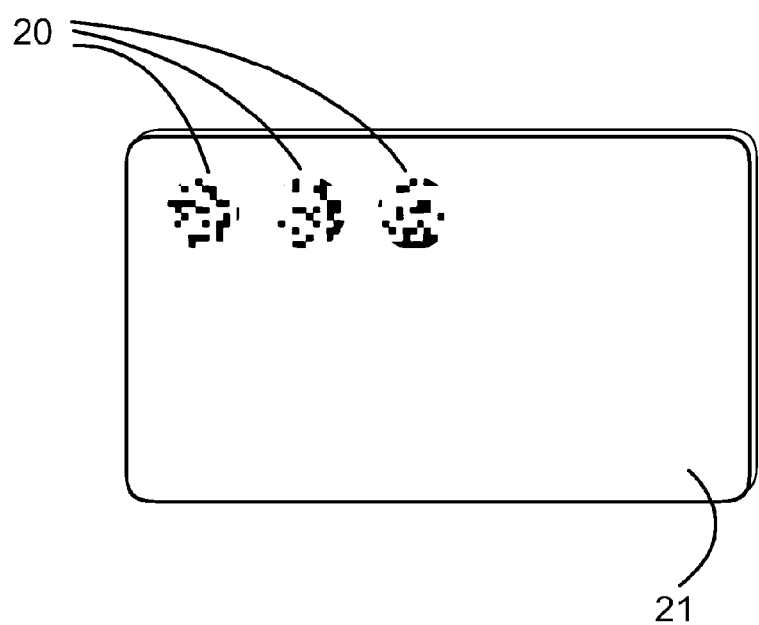
FIG. 4 is a pictorial view of a regular opaque membership card 21 with transparent sections demonstrating a variation on transparent window shape and size, in this particular example takes the form of three separate transparent circular sections 20.
Figure 5:
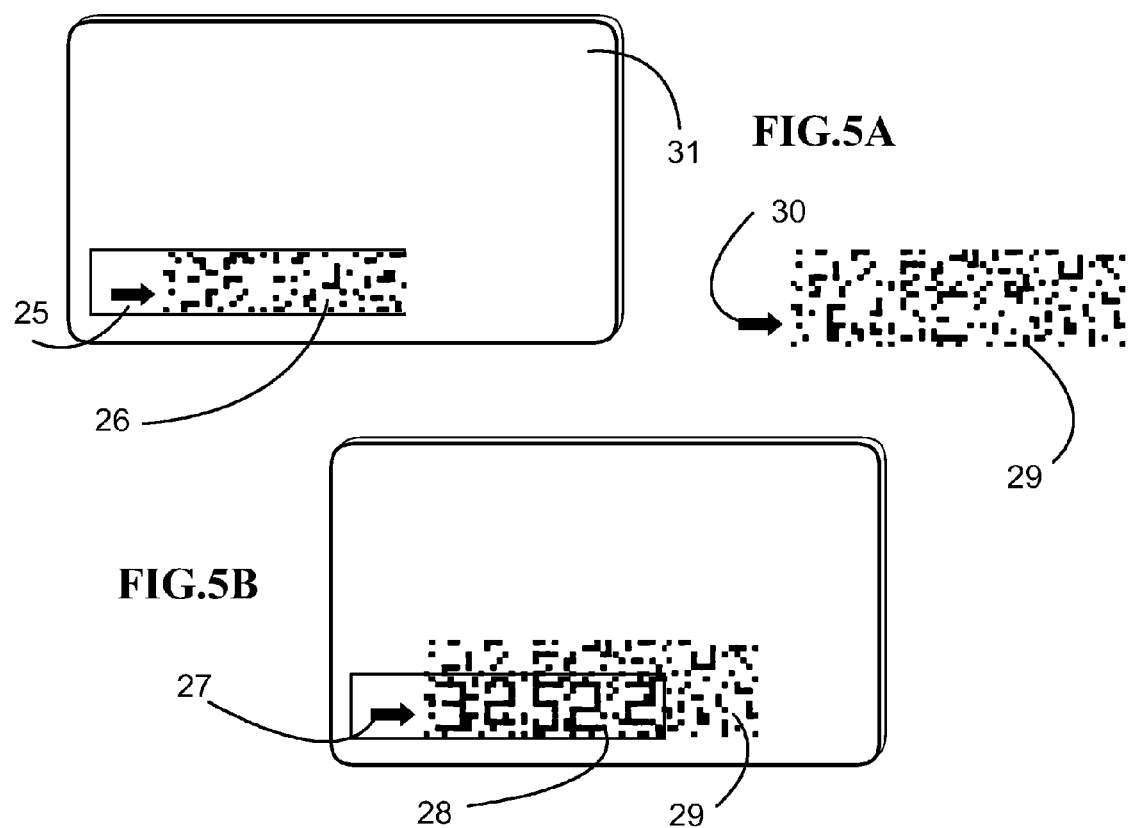
FIG. 5 is a pictorial view illustrating a printed alignment marker 25 on a portion of the transparent window beside printed pattern 26 on a conventional plastic membership card 31.
Figure 6:
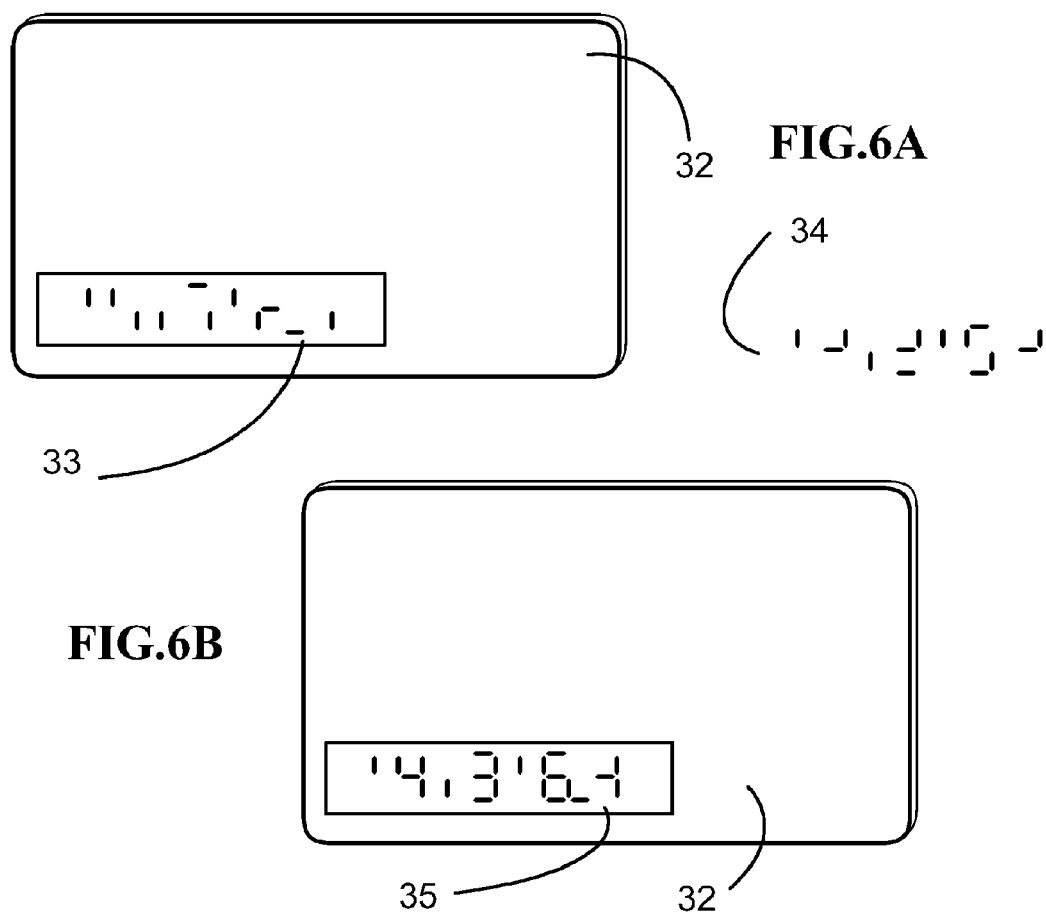
FIG. 6 is a pictorial view illustrating a possible segment display pattern 33 on a portion of the transparent window on a conventional plastic membership card 32
Figure 7:
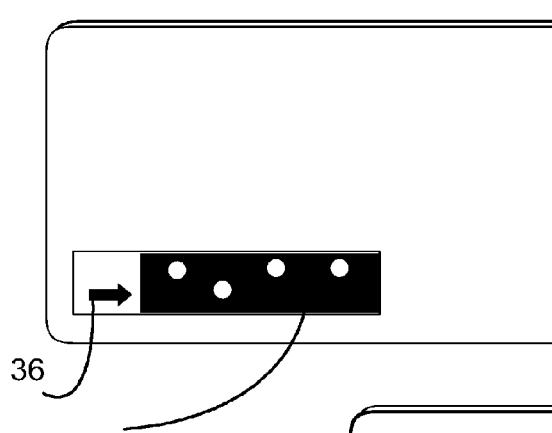
FIG. 7 is a pictorial view demonstrating a variation on the visual code method whereby a conventional plastic membership card 42 with a transparent window is printed with both an alignment marker 36 and a solid pattern which has a number of transparent circles 37 in a pre recorded proportional arrangement.
Figure 8:
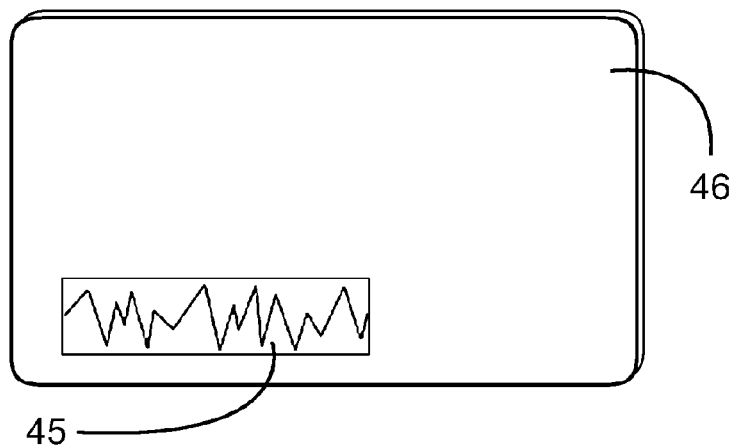
FIG. 8 is a pictorial view demonstrating a variation on the visual code method whereby a conventional plastic membership card 46 with a transparent window 45 has a specific printed pre recorded pattern.
Figure 8A:
FIG. 8A is a pictorial view illustrating a screen generated image pattern 47 with the user's recorded card pattern hidden at a specific position along the extended pattern.
Figure 8B:
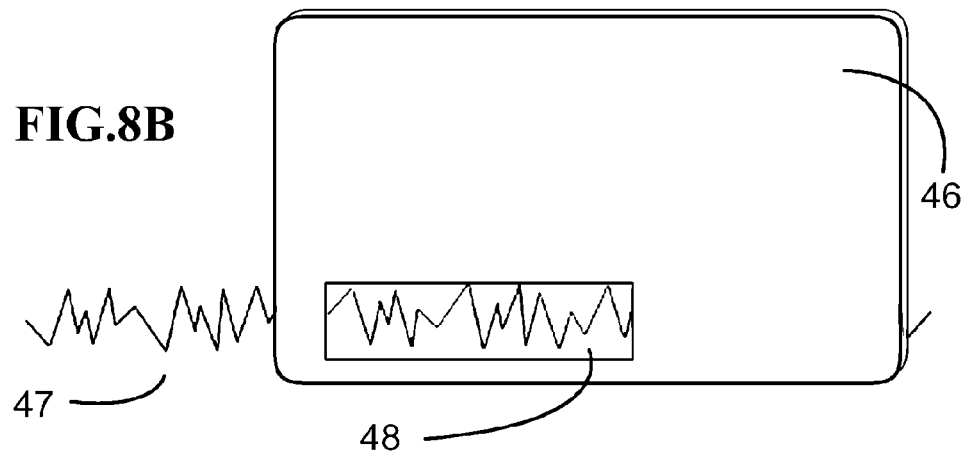
FIG. 8B is a pictorial view demonstrating the card's 46 correct alignment of the card's printed pattern 48 at the matching position over the screen generated image 47. This position is then used as verification data and manually entered into the computer terminal for verification.
Figure 9:
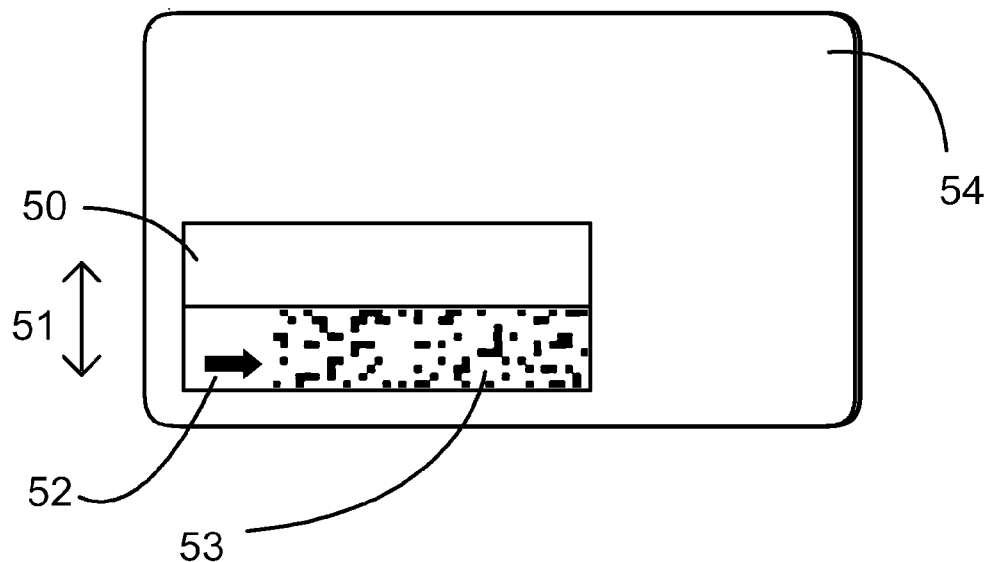
FIG. 9 is a pictorial view demonstrating a plastic membership card 54 with an opaque sliding cover 50 protecting both the alignment marker 52 and the transparent optical window complete with printed pattern 53. The cover 50 much like a modern computer floppy diskette slides across 51 the transparent window protecting the transparent printed pattern 53 from both damage and remote optical interception when not in use.
Figure 10:
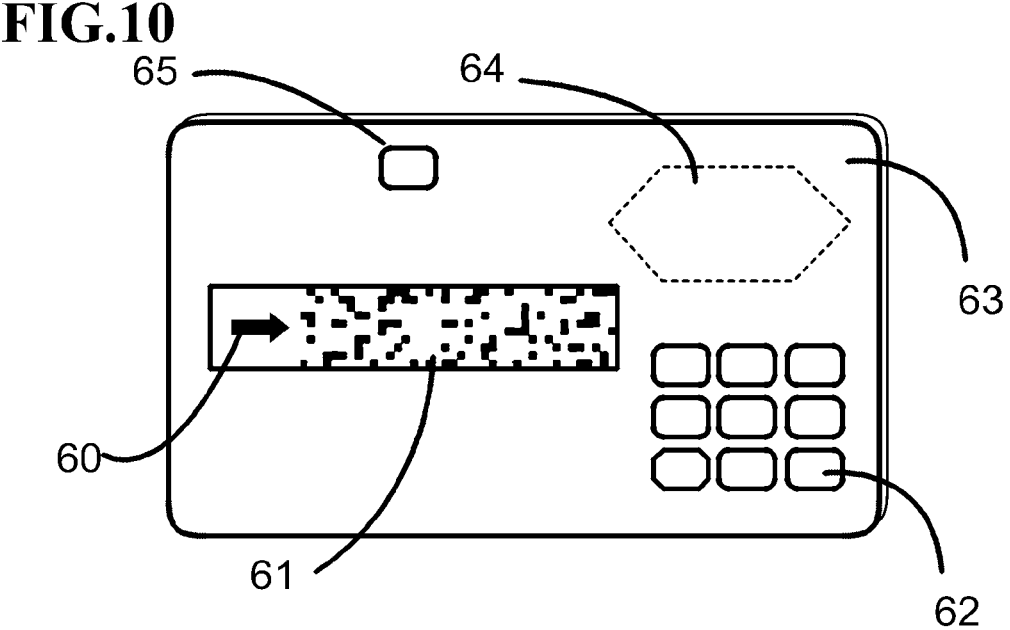
FIG. 10 shows a preferred embodiment of a trusted transaction verification apparatus. The apparatus comprises a substantially flat housing 63 suitable to work alongside conventional credit card techniques. Housing 63 includes data entry keys 62 preferably of the membrane type in order to reduce thickness of the housing 63 and to provide a robust structure that is not easily damaged by liquids or rough handling. Housing 63 also includes a transparent electronic digital display 61 preferably of an thin, flexible construction. This display 61 should be capable of generating the synchronized optical patterns necessary to provide the user with an optical code effect when placed correctly over either a regular computer display with a generated pattern image or another similar transaction verification apparatus. This display 61 should also be capable of generating a correctly placed alignment marker image 60 if the particular verification method requires this. Housing 63 also includes a metallic contact point 65 for communicating directly with other similar transaction verification apparatus or dedicated security hardware. The internal electronics of the apparatus 64 (schematically indicated by a dashed line) comprise the following interdependent components: a memory unit; an internal clock; a random number generator; a thin power source and a processor configured to generate the digital image pattern, optical code effect and process the cryptographic nature of this pattern as well as verify the users manual code entry.
Figure 11:
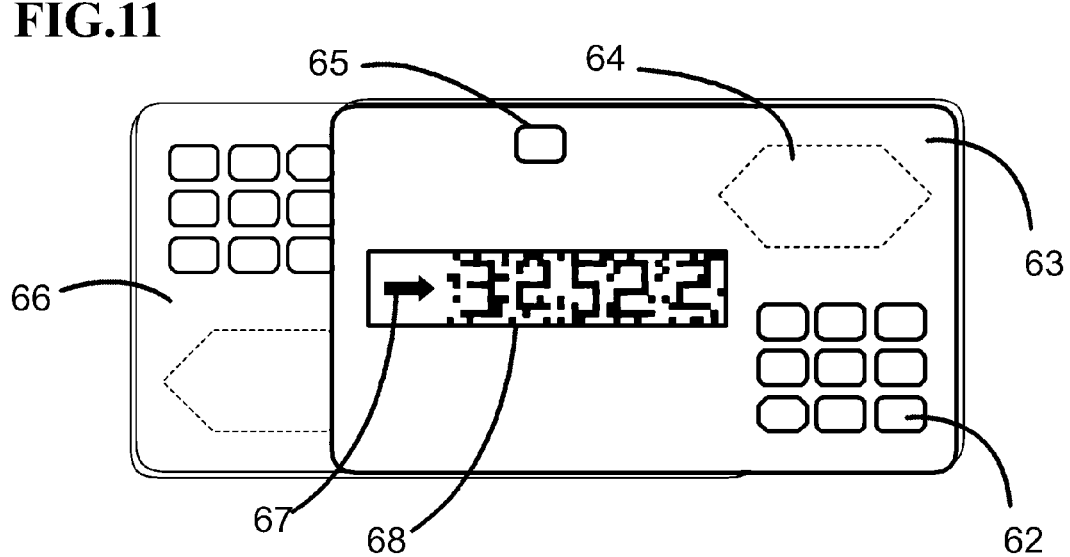
FIG. 11 is a pictorial view demonstrating two similar trusted transaction verification apparatus 63 and 66 verifying a transaction between the two. Both apparatus are similarly entered by their respective owners with the details of a specific transaction through their respective data entry keys 62. Both apparatus are then aligned on top of each other so as to visually align each others transparent digital display's 61 correctly by use of both apparatus alignment markers 67. Both apparatus identify each other through their respective metallic contact points 65 and establish a unique identity for each other. This activates the internal electronics 64 to cryptographically generate a synchronized digital pattern on each respective transparent display 61 creating a visual code 68 from the combination of both separate transparent display 61 patterns. This visual code which is apparent to the users of both apparatus is then entered into each apparatus data entry keys 62 by their respective users, providing a secure one time validation of the transaction. The cryptographic algorithms used are based on the respective identity data of the separate apparatus as well as data from both the random number generator and internal clock, the primary security resting on the unique visual confirmation code 68 which is only synchronized when both patterns are correctly generated.

The best form of the invention is the standard plastic identification non electronic PVC card with the optical pattern printed across a transparent strip thereon. The card is then placed in the correct position across an ordinary internet connected computer screen displaying the synchronized image generated from details recorded on a secure database. The readable optical code effect is then manually entered by the user into the internet connected computer which is used to verify authenticity of the remote card holding member. An electronic version of the transaction verification method with greater security and versatility, consists of a smart card with a built in battery and transparent digital display capable of generating a dynamic optical pattern from a cryptographic algorithm in synchronization with either a regular computer screen or another similar apparatus.

INDUSTRIAL APPLICABILITY

Can be used in all transaction verification systems such as verifying electronic cash payments for payment cards as well as verifying remote identification membership cards.

The invention claimed is:

1. A method of generating a dynamic visual code as a combination of elongated segments, which consists of a transparent window with a first pattern of elongated segments printed on it, and an authentication application, and
   the said authentication application generates a string of characters, and
   the said authentication application generates a dynamic visual code representing the generated string of characters with elongated segments, and
   the said authentication application generates a random set of elongated segments, and
   the said authentication application combines those of the randomly generated elongated segments with said dynamic visual code to produce a second pattern of elongated segments, and
   an electronic display showing to the user the second pattern of elongated segments, which reveals the dynamic visual code when the first pattern is superimposed with it and correctly aligned.

2. A method of generating a dynamic visual code as described in claim 1, where the said authentication application removes some of the elongated segments of the second pattern, which obstruct human comprehension of the dynamic visual code.

3. A method of generating a dynamic visual code of characters drawn as a combination of elongated segments as described in claim 1, which also includes a first visual marker symbol, and
 a second visual marker symbol, and
 where the first visual marker symbol is displayed proportionally adjacent to the elongated segments on the first pattern, and
 where the second visual marker symbol is printed on the transparent window, and in which the user matches the first visual marker with the second visual marker during superimposition.

4. A method of generating a dynamic visual code according to claim 1, in which the elongated segments are depicted with specific shading of individual segments.

5. A method of generating a dynamic visual code according to claim 1, in which the second pattern of elongated segments is animated behind the first pattern of elongated segments, and where the visual code of characters is revealed to the user at a set point in time.

* * * * *